United States Patent
Kobren et al.

(10) Patent No.: US 12,242,568 B2
(45) Date of Patent: Mar. 4, 2025

(54) GUIDED AUGMENTATION OF DATA SETS FOR MACHINE LEARNING MODELS

(71) Applicant: Oracle International Corporation, Redwood Shores, CA (US)

(72) Inventors: Ariel Gedaliah Kobren, Cambridge, MA (US); Swetasudha Panda, Burlington, MA (US); Michael Louis Wick, Lexington, MA (US); Qinlan Shen, Burlington, MA (US); Jason Anthony Peck, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 154 days.

(21) Appl. No.: 17/903,798

(22) Filed: Sep. 6, 2022

(65) Prior Publication Data
US 2023/0401286 A1 Dec. 14, 2023

Related U.S. Application Data

(60) Provisional application No. 63/352,110, filed on Jun. 14, 2022.

(51) Int. Cl.
*G06F 18/214* (2023.01)
*G06F 40/56* (2020.01)

(52) U.S. Cl.
CPC .......... *G06F 18/2148* (2023.01); *G06F 40/56* (2020.01)

(58) Field of Classification Search
CPC ............... G06F 18/2148; G06F 40/56
See application file for complete search history.

(56) References Cited

U.S. PATENT DOCUMENTS

| | | | |
|---|---|---|---|
| 11,669,687 B1 | 6/2023 | Joshi et al. | |
| 11,704,506 B2* | 7/2023 | Sellam | G06F 40/56 |
| | | | 704/2 |
| 2005/0102614 A1* | 5/2005 | Brockett | G06F 40/44 |
| | | | 715/256 |
| 2007/0129935 A1* | 6/2007 | Uchimoto | G06F 40/47 |
| | | | 704/9 |
| 2009/0119090 A1* | 5/2009 | Niu | G06F 40/247 |
| | | | 704/1 |
| 2018/0189272 A1* | 7/2018 | Noh | G06N 3/045 |
| 2019/0057081 A1* | 2/2019 | Choi | G06F 40/56 |
| 2019/0349321 A1 | 11/2019 | Cai et al. | |
| 2019/0370336 A1 | 12/2019 | Prakash et al. | |

(Continued)

OTHER PUBLICATIONS

Guu K. et al., "Generating Sentences by Editing Prototypes", Transactions of the Association for Computational Linguistics, 2018, pp. 14.

(Continued)

*Primary Examiner* — Eric Yen
(74) *Attorney, Agent, or Firm* — Invoke

(57) ABSTRACT

Techniques are disclosed for augmenting data sets used for training machine learning models and for generating predictions by trained machine learning models. These techniques may increase a number and diversity of examples within an initial training dataset of sentences by extracting a subset of words from the existing training dataset of sentences. The techniques may conserve scarce sample data in few-shot situations by training a data generation model using general data obtained from a general data source.

21 Claims, 5 Drawing Sheets

(56) References Cited

U.S. PATENT DOCUMENTS

| | | | |
|---|---|---|---|
| 2020/0013407 A1* | 1/2020 | Chae | G06F 3/167 |
| 2020/0134442 A1 | 4/2020 | Sim et al. | |
| 2020/0226212 A1 | 7/2020 | Tan et al. | |
| 2020/0241917 A1 | 7/2020 | Chen et al. | |
| 2020/0302273 A1 | 9/2020 | Chung et al. | |
| 2020/0334336 A1 | 10/2020 | Azermai | |
| 2020/0342182 A1* | 10/2020 | Johnson Premkumar | G06N 3/044 |
| 2020/0410345 A1* | 12/2020 | Morishita | G06N 3/0442 |
| 2021/0012156 A1 | 1/2021 | Vijaykeerthy et al. | |
| 2021/0064826 A1 | 3/2021 | Rajagopal et al. | |
| 2021/0173872 A1 | 6/2021 | Tan et al. | |
| 2021/0224486 A1 | 7/2021 | Stabler et al. | |
| 2021/0326751 A1 | 10/2021 | Liu et al. | |
| 2021/0334459 A1 | 10/2021 | Dvijotham et al. | |
| 2021/0342552 A1 | 11/2021 | Mishra et al. | |
| 2022/0138239 A1* | 5/2022 | Saito | G06F 40/30 704/9 |
| 2022/0366155 A1* | 11/2022 | Morishita | G06N 3/096 |
| 2023/0025317 A1 | 1/2023 | Miao | |

OTHER PUBLICATIONS

Lai Ivan, "Conditional Text Generation by Fine Tuning GPT-2", Retrieved from https://towardsdatascience.com/conditional-text-generation-by-fine-tuning-gpt-2-11c1a9fc639d, Jan. 27, pp. 1-9.

Uchimoto K. et al., "Text generation from keywords", Proceedings of the 19th international conference on Computational linguistics, 2002, vol. 1, pp. 7.

Li, D., Zhang, Y., Peng, H., Chen, L., Brockett, C., Sun, M. T., & Dolan, B. (2020). Contextualized perturbation for textual adversarial attack. arXiv preprint arXiv:2009.07502. (Year: 2020).

Nie, W., Narodytska, N., & Patel, A. (2018, September). Relgan: Relational generative adversarial networks for text generation. In International conference on learning representations. (Year: 2018).

Sellam, T., Das, D., & Parikh, A. P. (2020). BLEURT: Learning robust metrics for text generation. arXiv preprint arXiv:2004.04696. (Year: 2020).

Xu, J., Ren, X., Lin, J., & Sun, X. (2018). Diversity-promoting Gan: A cross-entropy based generative adversarial network for diversified text generation. In Proceedings of the 2018 conference on empirical methods in natural language processing (pp. 3940-3949). (Year: 2018).

Zhang, T., Kishore, V., Wu, F., Weinberger, K. Q., & Artzi, Y. (2019). Bertscore: Evaluating text generation with bert. arXiv preprint arXiv: 1904.09675. (Year: 2019).

Zhou, W., Ge, T., Xu, C., Xu, K., & Wei, F. (2021). Improving sequence-to-sequence pre-training via sequence span rewriting. arXiv preprint arXiv:2101.00416. (Year: 2021).

"Diverse Data Augmentation via Unscrambling Text with Missing Words," Anonymous EMNLP submission, pp. 1-11.

Alishahi, A., et al., "Analyzing and Interpreting Neural Networks for NLP: a Report on the First BlackboxNLP Workshop," Natural Language Engineering, vol. 25, Issue 4, Jul. 2019, pp. 19.

Alzantot, M., et al., "Generating Natural Language Adversarial Examples," Proceedings of the 2018 Conference on Empirical Methods in Natural Language Processing, Oct.-Nov. 2018, pp. 9.

Casanueva, I., et al., "Efficient Intent Detection with Dual Sentence Encoders," Proceedings of the 2nd Workshop on Natural Language Processing for Conversational AI, Jul. 9, 2020, pp. 38-45.

Coucke, A., et al., "Snips Voice Platform: an embedded Spoken Language Understanding system for private-by-design voice interfaces," May 2018, pp. 29.

Devlin et al., "BERT: Pre-training of deep bidirectional transformers for language understanding," In Proceedings of the 2019 Conference of the North American Chapter of the Association for Computational Linguistics, 2019, pp. 4171-4186.

Gardner, M., et al., "Evaluating Models' Local Decision Boundaries via Contrast Sets," Findings of the Association for Computational Linguistics: EMNLP 2020, Jan. 2020, pp. 17.

Gu, J., et al., "Search engine guided neural machine translation," In Thirty-Second AAAI Conference on Artificial Intelligence, Apr. 27, 2018, pp. 5133-5140.

Han, X., et al., "Explaining black box predictions and unveiling data artifacts through influence functions," Proceedings of the 58th Annual Meeting of the Association for Computational Linguistics, Jul. 5-10, 2020, pp. 5553-5563.

Jia, R., et al., "Adversarial Examples for Evaluating Reading Comprehension Systems," Proceedings of the 2017 Conference on Empirical Methods in Natural Language Processing, Sep. 2017, pp. 2021-2031.

Kaushik, D., et al., "Learning the difference that makes a difference with counterfactually-augmented data," In International Conference on Learning Representations, 2020, pp. 17.

Khandelwal, U., et al., "Generalization through memorization: Nearest neighbor language models," ICLR, 2020, pp. 13.

Kobayashi, S., et al., "Contextual Augmentation: Data Augmentation byWords with Paradigmatic Relations," Proceedings of NAACL-HLT, Jun. 1-6, 2018, pp. 452-457.

Koh, P.W. et al., "Understanding black-box predictions via influence functions," In Proceedings of the 34th International Conference on Machine Learning, vol. 70, Mar. 14, 2017. pp. 1885-1894.

Larson, S., et al., "An evaluation dataset for intent classification and out-of-scope prediction," In Proceedings of the 2019 Conference on Empirical Methods in Natural Language Processing and the 9th International Joint Conference on Natural Language Processing (EMNLP-IJCNLP), Nov. 3-7, 2019, pp. 1311-1316.

Lee, K., et al., "Neural Data Augmentation via Example Extrapolation," Cornell University. Feb. 2, 2021, pp. 14.

Li, C., et al., "Linguistically-Informed Transformations (LIT ): a Method for Automatically Generating Contrast Sets," Proceedings of the Third BlackboxNLP Workshop on Analyzing and Interpreting Neural Networks for NLP, Nov. 20, 2020, pp. 126-135.

Mccoy, R.T., et al., "Right for the wrong reasons: Diagnosing syntactic heuristics in natural language inference," Proceedings of the 57th Annual Meeting of the Association for Computational Linguistics, Jul. 28-Aug. 2, 2019, pp. 3428-3448.

Min, J., et al., "Syntactic Data Augmentation Increases Robustness to Inference Heuristics," Proceedings of the 58th Annual Meeting of the Association for Computational Linguistics, Jul. 5-10, 2020, pp. 2339-2352.

Rajani, N, F., et al., "Explaining and Improving Model Behavior with k Nearest Neighbor Representations," Oct. 2020, pp. 9.

Ribeiro et al., "Semantically Equivalent Adversarial Rules for Debugging NLP Models", In Proceedings of the 56th Annual Meeting of the Association for Computational Linguistics (vol. 1: Long Papers), 2018, pp. 856-865.

Ribeiro, M., et al., "Beyond Accuracy: Behavioral Testing of NLP Models with CheckList," Proceedings of the 58th Annual Meeting of the Association for Computational Linguistics, Jul. 5-10, 2020, pp. 4902-4912.

Weston, J., et al., "Retrieve and refine: Improved sequence generation models for dialogue," Proceedings of the 2018 EMNLP Workshop SCAI: The 2nd Int'l Workshop on Search-Oriented Conversational AI, Oct. 31, 2018, pp. 87-92.

Wiseman, S., "Label-Agnostic Sequence Labeling by Copying Nearest Neighbors, " Proceedings of the 57th Annual Meeting of the Association for Computational Linguistics, Jul. 28-Aug. 2, 2019, pp. 5363-5369.

Wolf, T., et al., "Huggingface's transformers: State-of-the-art natural language processing," Proceedings of the 2020 EMNLP, Nov. 16-20, 2020, pp. 38-45.

Zhang, J., et al., "Guiding Neural Machine Translation with Retrieved Translation Pieces," NAACL, 2018, pp. 11.

Garg, S., & Ramakrishnan, G. (2020). Bae: Bert-based adversarial examples for text classification. arXiv preprint arXiv:2004.01970. (Year: 2020).

Kumar, V., Choudhary, A., & Cho, E. (2020). Data augmentation using pre-trained transformer models. arXiv preprint arXiv: 2003. 02245. (Year: 2020).

(56) References Cited

OTHER PUBLICATIONS

Liu, P., Wang, X., Xiang, C., & Meng, W. (Aug. 2020). A survey of text data augmentation. In 2020 International Conference on Computer Communication and Network Security (CCNS) (pp. 191-195). IEEE. (Year: 2020).

Palomino, D., & Luna, J. O. (2020). Palomino-Ochoa at TASS 2020: Transformer-based Data Augmentation for Overcoming Few-Shot Learning. In IberLEF@SEPLN (pp. 171-178). (Year: 2020).

Wu, X., Lv, S., Zang, L., Han, J., & Hu, S. (2019). Conditional bert contextual augmentation. In Computational Science—ICCS 2019: 19th International Conference, Faro, Portugal, Jun. 12-14, 2019, Proceedings, Part IV 19 (pp. 84-95). (Year: 2019).

\* cited by examiner

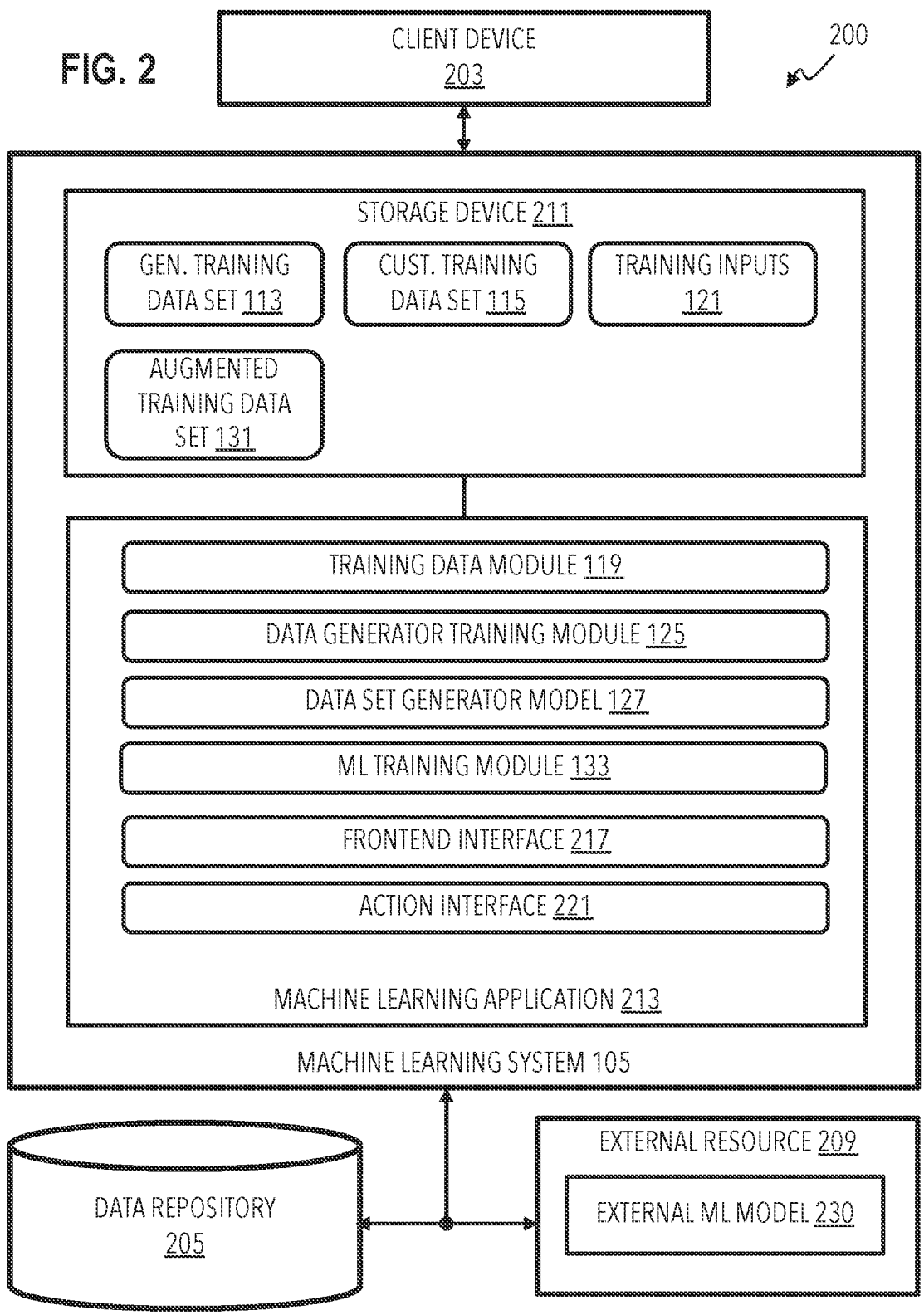

GUIDED AUGMENTATION OF DATA SETS FOR MACHINE LEARNING MODELS

INCORPORATION BY REFERENCE; DISCLAIMER

The following application is hereby incorporated by reference: U.S. Provisional Patent Application 63/352,110, filed Jun. 14, 2022, and U.S. Non-Provisional Application Ser. No. 17/903,796, filed on Sep. 6, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to machine learning. More specifically, the present disclosure relates to augmenting data used for training machine learning models.

BACKGROUND

Machine learning generates models trained to generate output predictions based on sample data sets. The accuracy of the predictions depends on the quantity and quality of the sample data sets. For example, machine learning models trained using sample data sets having few example datapoints in one or more classes, or a lacking variation among the datapoints included in a particular class, are likely to be inaccurate. As such, the accuracy of a machine learning model can be improved by obtaining sample data sets having a large number of diverse examples. However, in some situations, obtaining sample data sets having sufficient size and diversity can be challenging.

The approaches described in this Background section are approaches that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

FIG. 2 illustrates a system block diagram in accordance with one or more embodiments.

DETAILED DESCRIPTION

Figure 1:
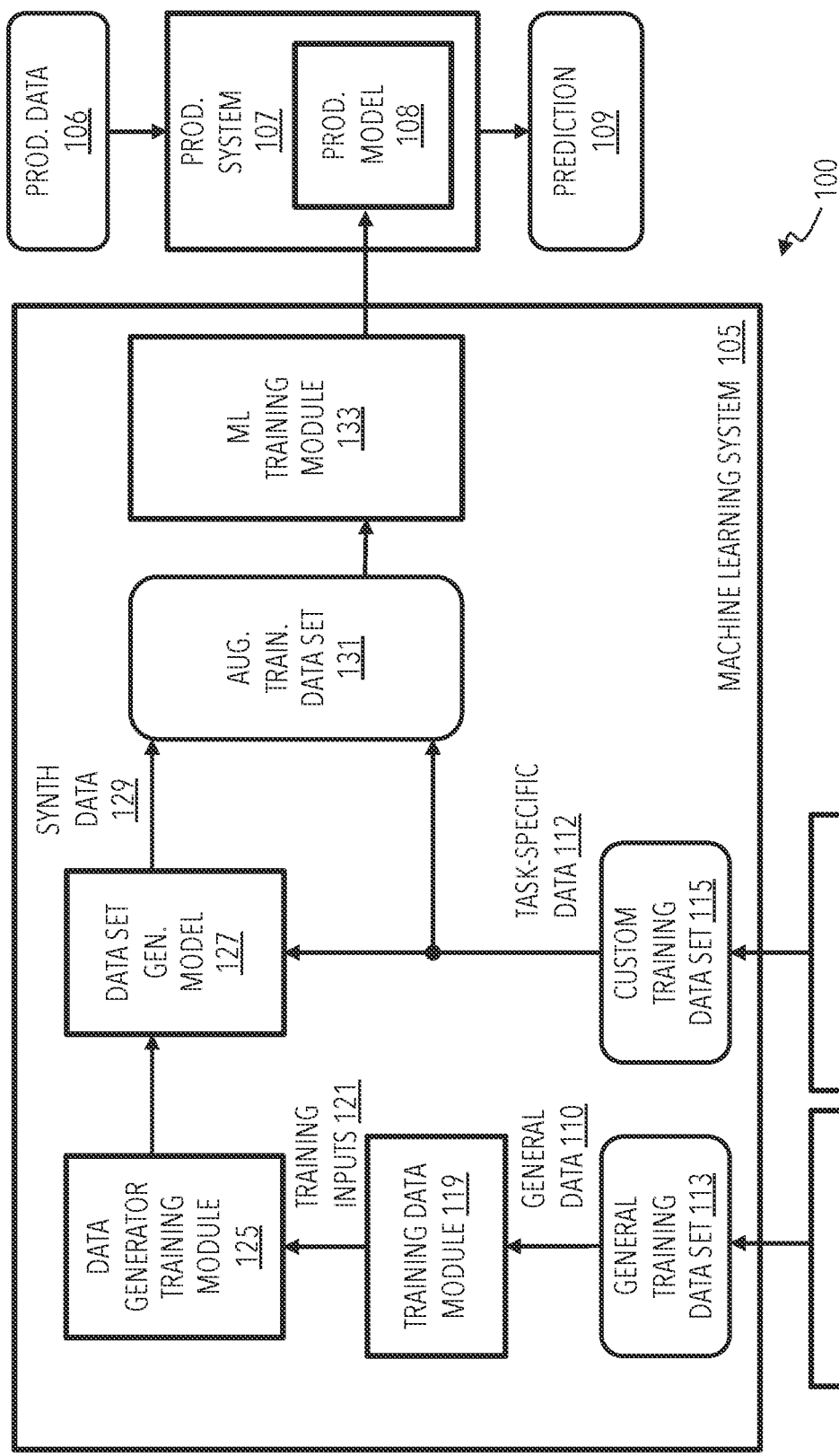
FIG. 1 illustrates a functional flow block diagram in accordance with one or more embodiments.

In the following description, for the purposes of explanation, numerous specific details are set forth in order to provide a thorough understanding. One or more embodiments may be practiced without these specific details. Features described in one or more embodiments may be combined with features described in a different embodiment. In some examples, well-known structures and devices are described with reference to a block diagram in order to avoid unnecessarily obscuring the present invention.

The embodiments are illustrated by way of example and not by way of limitation in the figures of the accompanying drawings. It should be noted that references to "an" or "one" embodiment in this disclosure are not necessarily to the same embodiment, and they mean at least one.

This Detailed Description section includes the following subsections:
A. GENERAL OVERVIEW
B. DATA AUGMENTATION PROCESS FLOW
C. DATA AUGMENTATION SYSTEM ARCHITECTURE
D. SYSTEM OPERATION
E. EXAMPLE EMBODIMENT
F. COMPUTER NETWORKS AND CLOUD NETWORKS
G. MISCELLANEOUS; EXTENSIONS
H. HARDWARE OVERVIEW

A. General Overview

Machine learning models can be trained and validated using a combination of sample data points and synthetic data points. Sample data points include information representing actual events, observations, conditions, and the like. Sample data points can be input to a machine learning algorithm to train a model to make predictions. Synthetic data points include information that is artificially created, rather than being generated by actual events. Synthetic data is often created from sample data points or portions thereof using a synthetic data generation model. In an example, a synthetic data generation model may generate a sentence by modifying words that are provided as a sample data point.

One or more embodiments generate training data that may be used to train or validate a machine learning model using a synthetic data generation model to enable the synthetic data generation model to generate synthetic data points. In an example scenario, the system generates training data for training a synthetic data generation model to generate sentences. The system obtains a text corpus that includes sentences, and extracts pairs of sentences such that a first sentence in a pair meets a similarity threshold with respect to a second sentence in the pair. The system then extracts a subset of words from the first sentence such that the subset of words does not include all words in the first sentence. The system generates a number training instances for training the synthetic data generation model from (a) model input that includes the second sentence and the subset of words extracted from the first sentence and (b) model output (e.g., target) that includes the first sentence. The training instances are used in training the synthetic data generation model such that the synthetic data generation model generates the first sentence when given, as input, the second sentence and the subset of words from the first sentence.

In one or more embodiments, extracting a subset of words from the first sentence, as described above, includes removing stop words, such as common articles, conjunctions, verbs, and prepositions (e.g., the, is, in, for, where, when, to, at, and the like). Extracting the subset of words can also include removing one or more other words from the target. For example, one or more words can be randomly removed from the sentence. Additionally, the remaining words can be reordered or shuffled.

One or more embodiments optimize machine learning in few-shot situations. A few-shot situation, as referred to herein, includes a situation when data points in some or all classes of a training data set are scarce. Scarcity of data points makes determination of an accurate machine learning model difficult due to a lack of examples available for training and validation of the model for a specific task. In accordance with one or more aspects of the present disclosure, sample data points that are task-specific to the machine learning model are conserved by training the data generation model using unspecific data points (e.g., non-task-specific data points) obtained from a general data source. The general data sources can be, for example, publicly available data sources including data that may be relevant to the intended tasks of the classifier model, but not specific to the purpose of the model. For instance, an example machine learning model can be directed to chatbot for customers of an insurance provider and the task-specific data can be directed to insurance customer service. The task-specific data points can be obtained from confidential logs of interactions between insurance customer service representatives and insurance customers. General data points can be obtained from a database including information sourced from online FAQs and Q&As of various online service providers. Thus, in the present example, the general data points may be relevant to a task of responding to user queries and can have similar characters regarding, for example, sentence length and sentence type (such as, commands, questions, and responses), but not specific to a task of responding to insurance customers queries.

One or more embodiments use the general data points to train a data generation model, while little or none of the task-specific data points are used for the training. One or more other embodiments solely use the general data points to train a data generation model. Once trained, the data generation model can be prompted with the task-specific data points to synthesize additional task-specific data points, which are used for training and/or validation of the machine-learning model.

In accordance with aspects of the present disclosure, the data generation model generates synthetic example data points resembling the task-specific data. The data generation can be quasi-controllable via guide words, which are part of the input to the data generation model. The model is trained to generate new examples that contain the given guide words. For example, the data generation model can be trained to reconstruct a given utterance or a natural language string the expresses some general class of intent (e.g., order a pizza) from another utterance of the same or similar intent, and guide words that appear in the utterance. After the data generation model is trained, it can be used to generate the new example data points, which can then added to the training set and/or validation set in order to enhance model training or model selection, respectively.

One or more embodiments described in this Specification and/or recited in the claims may not be included in this General Overview section.

B. Data Augmentation Process Flow

FIG. 1 shows a functional block diagram illustrating an example process flow 100 for augmenting machine learning training data in accordance with one or more embodiments. The example process flow 100 includes a general data source 101, a task-specific data source 103, a machine learning system 105, and a production system 107. The general data source 101 can be an information repository that stores general or general data 110 that may be relevant to an intended task of a desired machine learning model, but not specific to the intended task. In one or more embodiments, the general data source 101 is one or more public or commercially available data repository. For example, the general data source 101 can be a machine learning library, such as COMMONCRAWL, WIKIPEDIA®, KAGGLE, and the UCI MACHINE LEARNING REPOSITORY. The task-specific data source 103 can be one or more information repositories that stores task-specific data 112 directed to an intended task of the desired machine learning model. In one or more embodiments, the task-specific data source 103 is a non-public data repository. For example, the task-specific data source 103 can be a confidential or proprietary data repository, such as database of transcribed conversations between customers and service representatives maintained by confidential information system. In another example, the task-specific data source 103 can be one or more logs of private surveillance information generated by a security system.

The machine learning system 105 can be one or more computing systems configured to process data from the data sources 101 and 103 to construct a production model 108 for processing by the production system 107. The production system 107 can be one or more computing systems configured to generate predictions 109 from production data 106 using a production model 108 determined by the machine learning system 105. For example, the production model 108 can be an intent classifier for a chatbot, digital assistant, or automated voice response system. The production data 106 can be a natural language query from a user, such as an utterance, to the production system 107. The prediction 109 can be a classification of the query's intent used to determine a response to the query.

The example process flow 100 includes the machine learning system 105 constructing a generalized training data set 113 using general data 110 obtained from the general data source 101. Additionally, the machine learning system 105 constructs a custom training data set 115 using task-specific data 112 obtained from the task-specific data source 103. The task-specific data 112 can be particularly directed to the purpose of the machine learning model desired. In accordance with aspects of the present disclosure herein, the task-specific data 112 can be few-shot data. Few-shot data, as referred to herein, includes task-specific data 112 with only a few examples in one or more classes. In some implementations, a few-shot sample data set can have five or fewer data points per class predicted by a machine learning model. In some other examples, a few-shot sample data set can have ten or fewer data points per class. In some other example, a few-shot sample data set can have less than 1,000 total data points.

The example process flow 100 can also include a training data module 119 that constructs training inputs 121 for training the data set generator model 127. The training data module 119 can use the general training data set 113, including the general data 110, to generate the training inputs 121. For example, the training data module 119 can use a sentence similarity function to extract pairs of similar sentences from the general training data set 113. For the individual pairs, the training data module 119 can designate the first sentence as a "primer" and the second as the "target," and can create a set of guide words from the target. Determining the set of guide words can also include removing one or more other words from the target. For example, the training data module 119 can randomly remove words from the target. Creating the set of guide words can further include shuffling the order of the remaining words.

Using the guide words, the training data module 119 can construct the training inputs 121 using a predefined schema processed by the data generator training module 125. For example, the training data module 119 can construct a training input using the following format: <primer>|<guide word 1><guide word 2> . . . <guide word k>. The output corresponding to this training input is the target. As such, the data generator training module 125 is trained to construct the target from the primer (i.e., a similar sentence) and the guide words (i.e., words that appear in the target). The primer "primes" the generator to generate a similar sentence and the guide words constrain what is generated. A desired number (N) such pairs are constructed and used as the generator training set (e.g., N=20).

The example process flow 100 further includes a data generator training module 125 that generates the data set generation model 127 using the training inputs 121 determined by the training data module 119. In some examples, data set generation machine model 127 may include one or both of supervised machine learning algorithms and unsupervised machine learning algorithms. Also, in some examples, the data set generation machine learning model 127 may be a machine learning model adapted for various aspects of natural language processing (NLP). For example, the data set generation machine learning model 127 can be a "sequence to sequence" model ("Seq2Seq") trained to receive a labeled first sequence and generate a different, second sequence consistent with the label applied to the first sequence. For example, the Seq2Seq model can be the T5 Model, which takes as input a sequence and generates a sequence as output.

The data set generation model 127 can generate synthetic data points 129 (e.g., new training examples) from the task-specific data 112 in the custom training data set 115. The synthetic data points 129 can be combined with the task-specific data 112 to construct an augmented training data set 131. The data set generation model 127 can generate a new synthetic data point 129 by selecting a primer example from the task-specific data 112. For example, the data set generation model 127 can randomly select the primer and guide words from the task-specific data 112. In a particular, non-limiting example, the data set generation model 127 builds a mapping from words used in the task-specific data to the number of times each is used (with respect to each class). Then, when generating an example of a class, data set generation model 127 samples guide words proportionally to their frequency as defined by the map corresponding to the class. The number of guide words can be sampled such that the generated examples have similar length to the examples in the task-specific data.

Additionally, the example process flow 100 includes machine learning training module 133 determining the production model 108 by training a machine learning algorithm using the augmented training data set 131 in a supervised or unsupervised machine learning algorithm. In some embodiments, the machine learning algorithm can be a classification algorithm, such as K-Nearest Neighbor, Naive Bayes, Random Forest, Support Vector Machine, and Logistic Regression. The training algorithm can also be a regression algorithm, such as Linear Regression, Support Vector Regression, Decision Tress/Random Forest, and Gaussian Progresses Regression.

C. Data Augmentation System Architecture

FIG. 2 illustrates a system 200 in accordance with one or more embodiments. As illustrated in FIG. 2, system 200 includes a machine learning system 105, client device 203, a data repository 205, and external resource 209. The machine learning system 105 can be the same or similar to that previously described. In one or more embodiments, the system 200 can include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

The client device 203 may be a web browser, a mobile application, or other software application communicatively coupled to a network (e.g., via a computing device). The client device 203 may interact with other elements of the system 200 directly or via cloud services using one or more communication protocols, such as HTTP and/or other communication protocols of the Internet Protocol (IP) suite. In some examples, the client device 203 is configured to receive and/or generate data items that are stored in the data repository 205. The client device 203 may transmit target data items to the machine learning system 105 for analysis. In some examples, the client device 203 may send instructions to the machine learning system 105 that initiate processes to generate synthetic data points (e.g., synthetic data points 129) from task-specific data points (e.g., task-specific data 112) using one or more machine learning models (e.g., data set generation model 127). The client device 203 may send instructions to the machine learning system 105 to analyze target data items.

The client device 203 may also include a user input/output device configured to render a graphic user interface (GUI) generated by the machine learning system 105. The GUI may present an interface by which a user triggers execution of computing transactions, thereby generating and/or analyzing data items. In some examples, the GUI may include features that enable a user to view training data, classify training data, instruct the machine learning system 105 to execute processes to augment or otherwise increase a number of examples in a training dataset, and other features of embodiments described herein. Furthermore, the client device 203 may be configured to enable a user to provide user feedback via a GUI regarding the accuracy of the machine learning system 105 analysis. That is, a user may label, using a GUI, an analysis generated by the machine learning system 105 as accurate or not accurate. In some examples, using a GUI, the user may cause execution of operations (e.g., a loss function analysis) that measure a degree of accuracy of the analysis produced by the machine learning system 105. These latter features enable a user to label or otherwise "grade" data analyzed by the machine learning system 105 so that the machine learning system 105 may update its training.

In one or more embodiments, data repository 205 may be any type of storage unit and/or device (e.g., a file system, database, collection of tables, or any other storage mechanism) for storing data. Further, data repository 122 may each include multiple different storage units and/or devices. The multiple different storage units and/or devices may or may not be of the same type or located at the same physical site. Further, data repository 122 may be implemented or may execute on the same computing system as the machine learning application 213. Alternatively or additionally, data repository 122 may be implemented or executed on a computing system separate from the machine learning application 213. Data repository 122 may be communicatively coupled to the machine learning application 213 via a direct connection or via a network.

Some embodiments of the machine learning system 105 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

The machine learning system 105 illustrated in FIG. 2 includes a storage device 211 and a machine learning application 213. The storage device 211 can include a magnetic storage device, a flash drive, a compact disk ROM, a digital versatile disk (DVD) optical storage technology, or suitable other fixed, non-transitory computer-readable storage devices. The storage device 211 can also store the program instructions (e.g., code) and operational data for the operation of the machine learning system 105. Further, the storage device 211 can store a general training data set 113, a custom training data set 115, training inputs 121, and augmented training data set 131, which can all be the same or similar to that previously described. It is understood that some or all of the information used by the machine learning system can be stored remotely, such as in the data repository 205.

The machine learning application 213 of the system 200 may be configured to train a data generation model (e.g., data set generation model 127) that generates synthetic training data (e.g., synthetic data points 129) based on an initial dataset (e.g., general data 110). For example, the data generation model may generate a new natural language processing dataset based on a limited (e.g., containing few examples) initial dataset, and the use the new natural language processing dataset to further train a separate machine learning model (e.g., production model 108) configured for interpreting human generated natural language (e.g., a chatbot). The new natural language processing dataset generated by the machine learning application 213 and used to train the chatbot may improve the accuracy and operational efficiency of the chatbot operation. The machine learning application 213 can include a training data module 119, a data generator training module 125, data set generation model 127, a machine learning training module 133, which can all be the same or similar to those previously described and are further detailed below. Additionally, the machine learning system 105 can include a frontend interface 217, and an action interface 220.

The frontend interface 217 manages interactions between the client device 203 and the machine learning application 213. In one or more embodiments, frontend interface 217 refers to hardware and/or software configured to facilitate communications between a user and the client device 203 and/or the machine learning application 213. In some embodiments, frontend interface 217 is a presentation tier in a multitier application. Frontend interface 217 may process requests received from clients and translate results from other application tiers into a format that may be understood or processed by the clients. For example, the client device 203 may submit requests to the machine learning application 213 via the frontend interface 217 to perform various functions, such as for labeling training data and/or analyzing target data. In some examples, the client device 203 may submit requests to the machine learning application 213 via the frontend interface 217 to view a graphic user interface related to natural language processing analysis. In still further examples, the frontend interface 217 may receive user input that re-orders individual interface elements.

Frontend interface 217 refers to hardware and/or software that may be configured to render user interface elements and receive input via user interface elements. For example, frontend interface 217 may generate webpages and/or other graphical user interface (GUI) objects. Client applications, such as web browsers, may access and render interactive displays in accordance with protocols of the internet protocol (IP) suite. Additionally or alternatively, frontend interface 217 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In one or more embodiments, different components of the frontend interface 217 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 217 is specified in one or more other languages, such as Java, C, or C++.

The action interface 220 may include an API, CLI, or other interfaces for invoking functions to execute actions. One or more of these functions may be provided through cloud services or other applications, which may be external to the machine learning application 213. For example, one or more components of machine learning application 213 may invoke an API to access information stored in a data repository (e.g., data repository 222) for use as a training corpus for the machine learning application 213. It will be appreciated that the actions that are performed may vary from implementation to implementation.

In some embodiments, the machine learning application 213 may access external resource 226, such as cloud services. Example cloud services may include, but are not limited to, social media platforms, email services, short messaging services, enterprise management systems, and other cloud applications. Additional embodiments and/or examples relating to computer networks are described below in Section 6, titled "Computer Networks and Cloud Networks."

In some examples, the external resource 226 may include an external machine learning model 230 that is trained using the training datasets generated by the machine learning application 213. In one example, training datasets generated by the machine learning application 213 may be used to train a user-facing natural language processing applications, such as a chatbot (for instant text communications) or an interactive voice recognition (IVR) system.

Action interface 220 may serve as an API endpoint for invoking a cloud service. For example, action interface 220 may generate outbound requests that conform to protocols ingestible by external resources. Action interface 220 may process and translate inbound requests to allow for further processing by other components of the machine learning application 213. The action interface 220 may store, negotiate, and/or otherwise manage authentication information for accessing external resources. Example authentication information may include, but is not limited to, digital certificates, cryptographic keys, usernames, and passwords. Action interface 220 may include authentication information in the requests to invoke functions provided through external resources.

In one or more embodiments, data repository 222 may be any type of storage unit and/or device (e.g., a file system, database, collection of tables, or any other storage mechanism) for storing data. Further, data repository 222 may each include multiple different storage units and/or devices. The multiple different storage units and/or devices may or may not be of the same type or located at the same physical site. Further, data repository 222 may be implemented or may execute on the same computing system as the machine learning application 213. Alternatively or additionally, data repository 222 may be implemented or executed on a computing system separate from the machine learning application 213. Data repository 222 may be communicatively coupled to the machine learning application 213 via a direct connection or via a network.

Information related to target data items and the training data may be implemented across any of components within the system 200. It is understood that this information may be stored in the data repository 222 for purposes of clarity and explanation.

In one or more embodiments, the system 200 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

D. System Operation

Figure 3A:
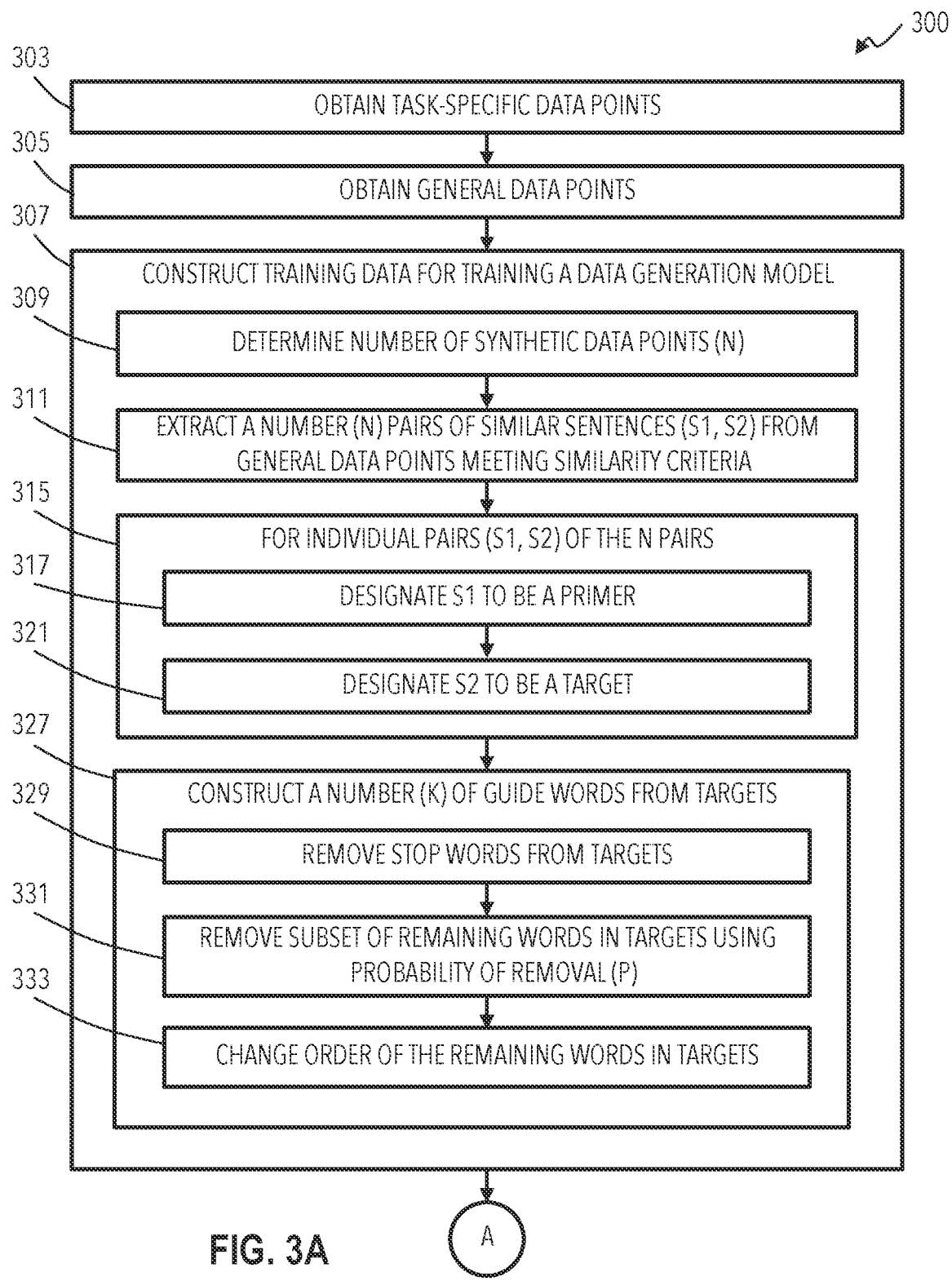
FIGS. 3A and 3B illustrate an example set of operations for improving a diversity of examples within an existing data set for training a machine learning model, in accordance with one or more embodiments.
Figure 3B:
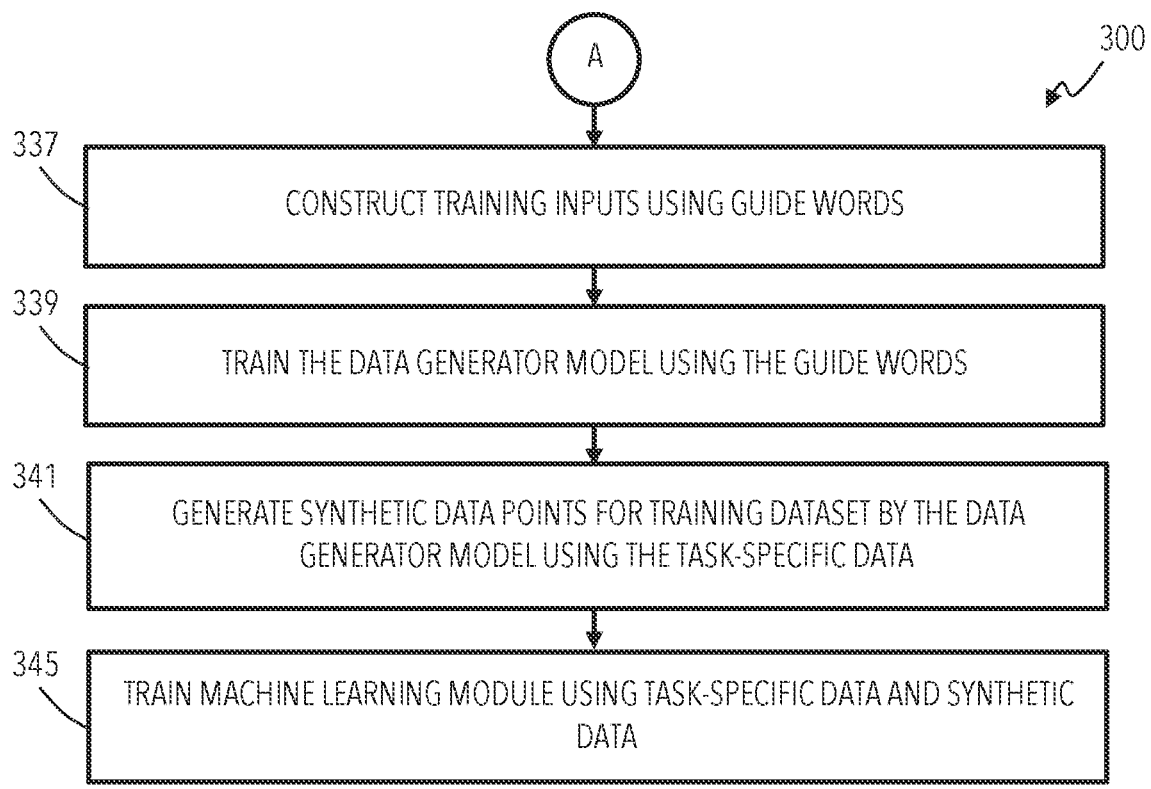

The flow diagrams in FIGS. 3A and 3B illustrate functionality and operations of systems, devices, processes, and computer program products according to various implementations of the present disclosure. Each block in FIGS. 3A and 3B can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A and 3B. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

FIG. 3 illustrates a process 300 that increases a diversity of examples in a training dataset in accordance with one or more embodiments. Training datasets generated according to the process 300 may be used to train other machine learning models, such as chatbots and automatic voice response systems. When trained with models generated according to the process 300, the other machine learning models illustrate improved accuracy in their predictions of natural language received from a user.

At block 303, the process 300 obtains task-specific data points (e.g., task-specific data 112) including information directed to the desired machine learning model. For example, for a customer service chatbot in a particular service sector, the task-specific data points can be examples obtained from confidential or proprietary logs of interactions between customers and service representatives in that service sector. In some embodiments, the task specific data can include, such as for a training dataset with few examples (e.g., fewer than 30 or fewer than 5), or a class within a training dataset with few examples. For example, the task-specific data can include sentences that have too few examples to effectively train a machine learning model such that it generates accurate, relevant, and/or grammatically correct predictions based on input data (e.g., text communications received from a person).

At block 305, the process 300 obtains general data points (e.g., general data 110). A general data source (e.g., general data source 101) can provide the general data to a machine learning system (e.g., machine learning system 105). As described above, example general sources can be public databases or commercially available databases. The general data points may be relevant or tangential to the purpose of the desired machine learning model. For example, the general data points can be included in public FAQs and Q&As, which contain lists of questions and answers, such as basic information for users of an online service.

At block 307, the process 300 constructs data (e.g., training inputs 121) for training a data generation model (e.g., data set generation model 127) In accordance with aspects of the present disclosure, one or more embodiments train the data generation module using only general data points or substantially only the general data points obtained at block 305 but uses none or substantially none of the task-specific data. Constructing the training generation model can include, at block 309, determining a desired number of synthetic data points (N) (e.g., synthetic data points 129) to be generated. In one or more embodiments, a user of a client device (e.g., client device 203) can communicate the number of synthetic data points (N). For example, the desired number of synthetic data points (N) can be 20 for each class label of the data included in the task-specific training data set (e.g. custom training data set 115)

Constructing the training generation model can also include, at block 311, extracting a number (N) pairs for similar sentences (S1, S2) from the general data points meeting a similarity criterion. Sentence similarity or semantic textual similarity is a measure of how similar two pieces of text are, or to what degree they express the same meaning. Related tasks include paraphrase or duplicate identification, search, and matching applications. Techniques used for determining text similarity can include word-vector dot products, pairwise classification, and deep neural networks. Similarity can be determined using a convention sentence similarity function, such as SENTEVAL in BERT.

Constructing the training generation model can also include, at block 315, for the individual pairs determined at block 311, designating a first sentence (S1) as a primer sentence at block 317 and designating a second sentence (S2) to be the target sentence. Constructing the data generation model can also include, at block 327, constructing a number (K) of guide words from the targets designated at block 321. Constructing the guide words can include, at block 329, removing stop words from the targets. Removing stop words from the sentences has a number of benefits. For example, by removing stop words, the system improves the diversity of the new examples generated because the system has more flexibility in generating examples by re-ordering words. More specifically, one aspect of diversity in a training dataset is the order of words used in an example sentence. By providing the system with a set of words associated with a particular sentence but without stop words, the system may generate one, two, or more different examples using the same set of input words but any number of different combinations of stop words in each of the different, newly generated, and grammatically correct example sentences.

In some examples, the system may remove stop words by, for example, first identifying stop words within a vector representation of a sentence. The system may identify stop words by applying search criteria, filtering, matching, or other NLP techniques to a vector representation of a sentence. The system may then apply a filter and/or search criteria using the applied labels. In other examples, the system may simply use text matching systems (e.g., character recognition, neural networks, classifiers, and other machine learning models) to identify stop words in the target sentence (or a corresponding vector). Once identified, the system may remove the stop words by deleting the stop words from a sentence.

Constructing the guide words can also include, at block 331, removing a subset of the remaining words in the targets using a probability of removal (P). In addition to removing the stop words, the system extracts a subset of words from the sentence (or, equivalently, a subset of tokens from a vector corresponding to the sentence). The extracted subset of words includes less than the complete set of words in the initial set of sentences received from the dataset generation model. The system may select the subset of words to be extracted using any of a number of techniques. In one example, the system applies a random selection function to each word (or equivalently, token) that determines whether or not to select a word in the sentence for the subset. In some examples, the system may bias selection of words based on part of speech, word length, type of content word (e.g., based on subject matter associated with the word), or other criteria. The removal of the subset of words can have many of the same benefits described above with the removal of stop words. In particular, removing a subset of content words increases a number of possible combinations of the remaining words when the system generates additional examples for a training dataset.

Constructing the guide words can also include, at block 333, changing the order of the remaining words from block 331. The system may then change an order of the extracted words relative to the order in which the extracted words appeared in the corresponding sentence received in the initial set of training sentences. The system may apply any technique to the extracted subset of words to change the order of the words. In some examples, the order of the words is randomized by application of a randomization function. Examples in which the order of remaining words is randomized may be particularly beneficial for refining training of the model by decoupling the order of the words from the predictive analysis of the model. In other words, randomizing the words in a sentence improves the analytical flexibility of a because the model is not trained to identify a specific order as required for certain input words. In other examples, the order of the words is changed by application of a systematic function. For example, a first word is moved to either one of a beginning or an end of a sentence and/or a second word is moved to one of a beginning, end, or middle of a sentence. In some examples, a single word is moved from a first location to a second location different from the first location. In other examples, two, three, or more words are moved from their corresponding locations to corresponding different locations. In still another example, a randomly selected number of words are moved from their respective first locations to different second locations. This re-ordering (or "shuffling") process may be executed on each sentence (or the remaining portions of the initially received sentences) of the initial set of sentences.

Continuing to FIG. 3B, as indicated by off-page connector "A," at block 337, the process 300 constructs training inputs (e.g., training inputs 121) using training data constructed at block 307. More specifically, using a predefined schema, a training data module (e.g., training data module 119) can construct the training inputs from the primers and targets designated at blocks 317 and 321, and the guide words constructed at block 327. For example, the training data module can construct target training inputs using the following format: <primer>|<guide word 1><guide word 2> . . . <guide word K>. The training data module generates a sentence that is similar to the primer and the guide words constrain generation of the target training input.

At block 339, the process 300 trains a data generator model to generate the target using the primer and the guide words. In other words, the data generator model is trained to construct the target from the primer (i.e., a similar sentence) and the guide words (i.e., words that appear in the target). For example, the process 300 trains the data generator model using the primer and guide words as inputs, and the target as an output. In one or more embodiments, the data generator model is a Sequence to Sequence ("Seq2Seq") model. The Seq2Seq can be, for example, the open-source Text-to-Text Transfer Transformer ("T5") Model.

At block 341, the process generates, using the data generator model, synthetic data points for training data set (e.g., augmented training data set 131) from the task-specific data (e.g., task-specific data 112) using the data generator model. The data generator model constructs the synthetic data points (targets) from the task-specific data (primer) and guide words to appear in the target. In one or more embodiments, the primer is a randomly selected task-specific example. The guide words are randomly sampled from the task-specific data based on their frequency in the task-specific data. For example, the process 300 can build a mapping from words used in the task-specific data to the number of times each is used (e.g., with respect to individual classes). Then, when generating an example the process 300 selects guide words proportionally to their frequency as defined by the map (e.g., corresponding to the class). The number of guide words is sampled such that the generated examples will have similar length to the examples in the task-specific data.

At block 345, the process 300 trains the machine learning module (e.g., production model 108) using the task-specific data points obtained at block 303 and the synthetic data generated at block 341. In one or more embodiments, the machine learning module is an intent classifier configured to classify a natural language query from a user (e.g., text or speech) for determining a response to the query. For example, a machine learning module (e.g., machine learning training module 133) can include one or both of supervised machine learning algorithms and unsupervised machine learning algorithms. In some embodiments, the machine learning algorithm can be a classification algorithm, such as K-Nearest Neighbor, Naive Bayes, Random Forest, Support Vector Machine, and Logistic Regression. The training algorithm can also be a regression algorithm, such as Linear Regression, Support Vector Regression, Decision Tress/Random Forest, and Gaussian Progresses Regression. During training, weights of the machine learning algorithm are optimized by minimizing loss, as defined by a loss function. Using the process 300 to increase a diversity of examples in a training dataset has the added benefit of efficiency because the diverse samples are based on an already existing training dataset. The additional effort (computational or otherwise) needed for obtaining, filtering, and classifying an entirely new and distinct dataset is avoided.

E. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

The present example trains a data generator model (e.g., data set generator model 127) to generate new training examples (e.g., synthetic data 129) resembling task-specific data, as previously described above. The new training examples can augment training data (e.g., training data sets 113 and 115) to generate an augmented training data set (e.g., augmented training data set 131) used for model training data and/or a validation data.

Training the data generator model includes determining the augmented training set. More specifically, the system (e.g., machine learning system 105 executing training data module 119) determines a number of training examples (N) for the augmented training set from a text corpus (C) using a sentence similarity function (S). The text corpus (C) may include publicly available intent classification datasets or documents of various topics. For example, if a task of the machine learning model to be trained is a chatbot that responds to customer services questions, the corpus (C) can include non-task-specific questions from FAQ pages in a crawl of public FAQ web pages. The sentence similarity function (S) can be an algorithm executed by the system that measures similarity between pairs of sentences in the corpus (C) to identify and extract N pairs of similar sentences. Some embodiments of the similarity function (S) identify sentences as similar based on a common attribute. For example, the similarity function S can determine that two sentences are similar based on the two sentences being included in the same FAQ. In each pair, the system designates the first sentence (S1) as the "primer" and the second sentence (S2) as the "target." In the present example, the similarity function (S) can identify the following pair of example sentences from a same customer service FAQ to be similar: "How do I obtain a refund?" and "What is the telephone number for customer service?" The first sentence, "How do I obtain a refund," can be designated as a primer and the second sentence, "What is the telephone number for customer service," can be designated as the target.

For each of the N pairs extracted from the corpus (C), the system determines a set of guide words from the target sentences. Determining the guide words includes removing stop words from the target sentence. Stop words include those words used in a phrase or sentence that perform a grammatical function but do not contribute directly to the meaning or content of a sentence. Examples of stop words include, but are not limited to, conjunctions (e.g., "and," "but"), articles (e.g., "a," "the"), prepositions (e.g., "by," "at," "with"), and some linking verbs and auxiliary verbs (e.g., "is," "are," "be,"), and the like. In the present example, the system can remove the words "is," "the," and "for" from the target sentence leaving "telephone number customer service."

Determining the guide words can also include randomly removing one or more words remaining in the target sentence using probability (P). Some embodiments apply a random selection function to each word that determines whether or not to select a word in the sentence for the subset. For example, using a random number generator having 20%, the system can make a random determination for each word of "telephone number customer service." Assuming for the present example that the system determined to remove the word "service" and determined not to remove the other words, the remaining words in the target sentence (S2) are: "telephone number customer."

Using the remaining words of the target sentence (S2), the system can determine the guide words by reordering. Some embodiments can randomize the order of the words using a randomization function. In the present example, the system can randomly reorder "telephone number customer" to "number telephone customer."

The guide words are part of the input to the data generator model, and the model is trained to generate new examples containing the guides words. More specifically, using the guide words determined for each of the N pairs, the system can determine N training inputs for the using the following format: "<primer>|<guide word 1><guide word 2> . . . <guide word k>". The primer "primes" the generator to generate a similar sentence and the guide words help to constrain what is generated. Using the present example, one training input could be: <How do I obtain a refund>|<number><telephone><service>. The output corresponding to this training input is the target. As such, the data generator model is trained to construct the target from the primer (i.e., a similar sentence) and the guide words (i.e., words that appear in the target) such that the data generator model is trained to determine task-specific training examples.

While the present example details a single training input of primer and guide words, it is understood that the system constructs N such pairs for determining the generator training set. The system (e.g., executing generator training module 125) trains the Seq2Seq (Sequence to Sequence) model using the generator training set (e.g., training inputs 121).

For example, the generator training set can fine tune a T5 pre-trained sequence to sequence model to generate new training examples (e.g., synthetic data 129).

Using the trained data generator model, the system (e.g., executing data set generator module 127) generates the new training examples using task-specific data points. Some embodiments randomly select the primer and guide words based on their frequency in task-specific data (e.g., task-specific data 112). For example, the system constructs a mapping from words used in the task-specific data to the number of times each is used. Then, when generating an example, the system samples guide words proportionally to their frequency as defined by the mapping. After the desired number of training examples have been generated, the system can add the training examples to the task-specific training set or validation set, as previously described above. The system (e.g., executing machine learning training module 133) can use the new training examples to train one or more machine learning models (e.g., production model 108).

F. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In one or more embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In one or more embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In one or more embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In one or more embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. It is understood that the database may be shared by multiple tenants.

In one or more embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

G. Miscellaneous Extensions

Embodiments are directed to a system with one or more devices that include a hardware processor and that are configured to perform any of the operations described herein and/or recited in any of the claims below.

In one or more embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

H. Hardware Overview

According to one or more embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
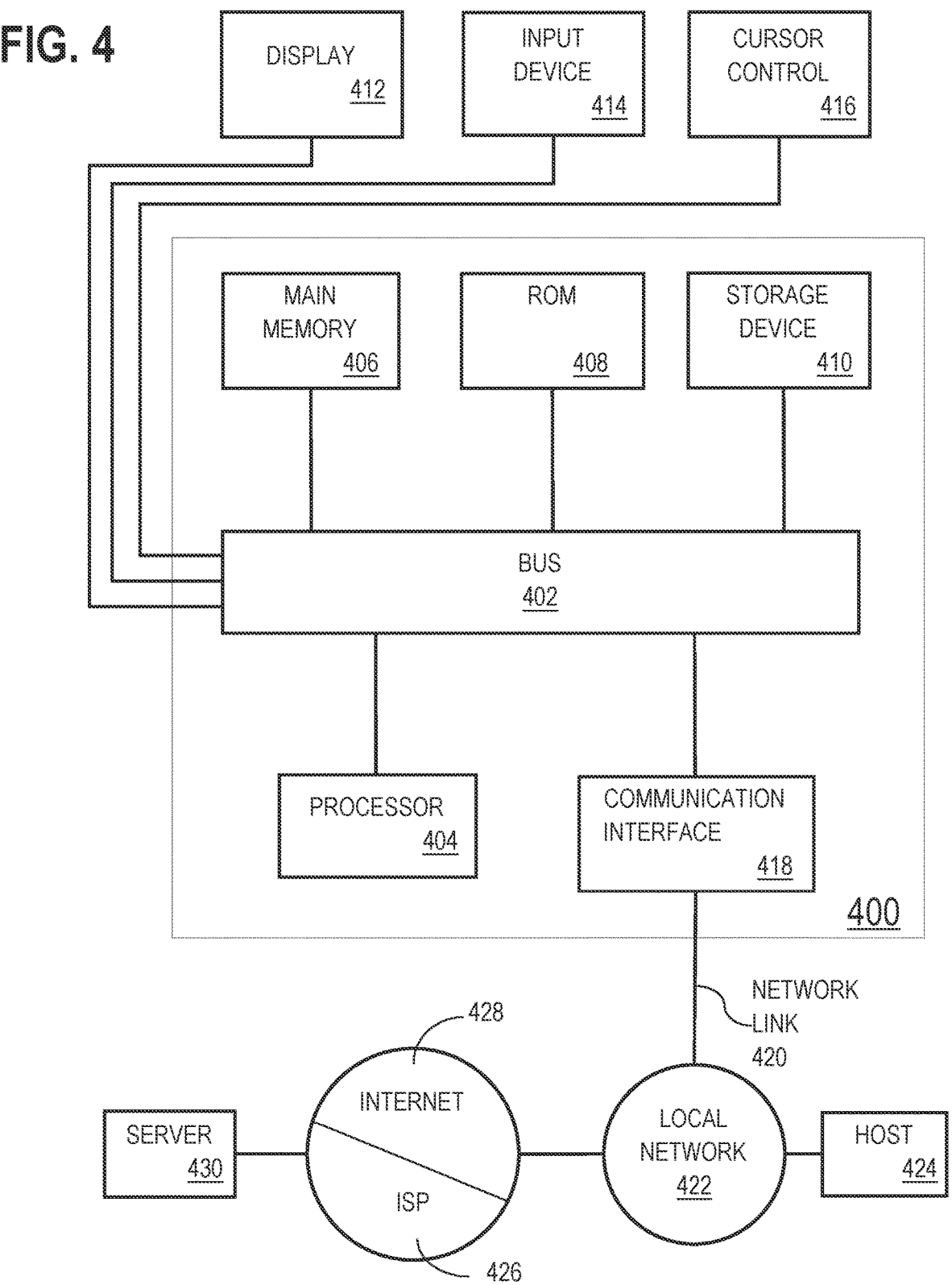
FIG. 4 shows a block diagram that illustrates a computer system in accordance with one or more embodiments.

For example, FIG. 4 is a block diagram that illustrates a computer system 400 upon which one or more embodiment of the invention may be implemented. The computer system 400 can be the same or similar to the computing systems previously described herein (e.g., machine learning system 105). Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one or more embodiments, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing program instructions that, when executed by one or more hardware processors, cause performance of operations comprising:
constructing a set of training inputs for training a synthetic data generation model, wherein the constructing the set of training inputs comprises:
extracting, from a first training data set, a plurality of pairs of sentences that meet a similarity criterion, individual pairs of the plurality of pairs including a first sentence and a second sentence;
for the individual pairs of the plurality of pairs:
extracting a first subset of words from the first sentence, the first subset excluding one or more words included in the first sentence; and
generating a first training instance from the set of training inputs, the first training instance comprising: (a) a model input including the second sentence and the subset of words from the first sentence, and (b) a model output including the first sentence; and
training the synthetic data generation model using the set of training inputs.

2. The media of claim 1, wherein the operations further comprise:
generating synthetic data using the trained synthetic data generation model.

3. The media of claim 2, wherein:
the first training data set comprises general data;
a second training data set comprises task-specific data; and
generating the synthetic data comprises applying the trained synthetic data generation model to sentences included in the second training data set.

4. The media of claim 3, wherein:
the trained synthetic data generation model is trained to construct the synthetic data from a primer sentence and a plurality of guide words;
the primer sentence causes the trained synthetic data generation model to generate a similar sentence; and
the plurality of guide words constrain generation of the similar sentence with respect to the primer sentence.

5. The media of claim 4, wherein the synthetic data comprises validation data for model selection of a classifier.

6. The media of claim 4, wherein the synthetic data comprises training data to train a classifier.

7. The media of claim 6, wherein:
the classifier is directed to a task;
the first training data set is unspecific to the task; and
the second training data set is directed to the task.

8. The media of claim 7, wherein content of the first training set excludes any content of the second training set.

9. A method comprising:
constructing a set of training inputs for training a synthetic data generation model, wherein constructing the set of training inputs comprises:
extracting, from a first training data set, a plurality of pairs of sentences that meet a similarity criterion, individual pairs of the plurality of pairs including a first sentence and a second sentence;
for the individual pairs of the plurality of pairs:
extracting a first subset of words from the first sentence, the first subset excluding one or more words included in the first sentence; and
generating a first training instance from the set of training inputs, the first training instance comprising: (a) a model input including the second sentence and the subset of words from the first sentence, and (b) a model output including the first sentence; and
training the synthetic data generation model using the set of training inputs.

10. The method of claim 9, further comprising:
generating synthetic data using the trained synthetic data generation model.

11. The method of claim 10, wherein:
the first training data set comprises general data;
a second training data set comprises task-specific data; and
generating the synthetic data comprises applying the trained synthetic data generation model to sentences included in the second training data set.

12. The method of claim 11, wherein:
the trained synthetic data generation model is trained to construct the synthetic data from a primer sentence and a plurality of guide words;
the primer sentence causes the trained synthetic data generation model to generate a similar sentence; and
the plurality of guide words constrain generation of the similar sentence with respect to the primer sentence.

13. The method of claim 12, wherein the synthetic data comprises validation data for model selection of a classifier.

14. The method of claim 12, wherein the synthetic data comprises training data to train a classifier.

15. The method of claim 14, wherein:
the classifier is directed to a task;
the first training data set is unspecific to the task; and
the second training data set is directed to the task.

16. The method of claim 15, wherein content of the first training set excludes any content of the second training set.

17. A system comprising:
a processor; and
a computer-readable data storage device storing program instructions that, when executed by the processor, control the system to perform operations comprising:
constructing a set of training inputs for training a synthetic data generation model, wherein the constructing the set of training inputs comprises:
extracting, from a first training data set, a plurality of pairs of sentences that meet a similarity criterion, individual pairs of the plurality of pairs including a first sentence and a second sentence;
for the individual pairs of the plurality of pairs:
extracting a first subset of words from the first sentence, the first subset excluding one or more words included in the first sentence; and
generating a first training instance from the set of training inputs, the first training instance comprising: (a) a model input including the second sentence and the subset of words from the first sentence, and (b) a model output including the first sentence; and
training the synthetic data generation model using the set of training inputs.

18. The system of claim 17, wherein the operations further comprise:
generating synthetic data using the trained synthetic data generation model,
wherein:
the first training data set comprises general data;
a second training data set comprises task-specific data; and
generating the synthetic data comprises applying the trained synthetic data generation model to sentences included in the second training data set.

19. The system of claim 18, wherein:
the trained synthetic data generation model is trained to construct the synthetic data from a primer sentence and a plurality of guide words;
the primer sentence causes the trained synthetic data generation model to generate a similar sentence; and
the plurality of guide words constrain generation of the similar sentence with respect to the primer sentence.

20. The system of claim 19, wherein the synthetic data comprises training data to train a classifier.

21. The system of claim 20, wherein:
the classifier is directed to a task;
the first training data set is unspecific to the task; and
the second training data set is directed to the task.

\* \* \* \* \*